United States Patent
Xu et al.

(10) Patent No.: US 6,717,781 B2
(45) Date of Patent: Apr. 6, 2004

(54) BALANCED QUENCH PROTECTION CIRCUIT

(75) Inventors: Minfeng Xu, Florence, SC (US); Xianrui Huang, Clifton Park, NY (US); Bu-Xin Xu, Florence, SC (US); Jinhua Huang, Florence, SC (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 109 days.

(21) Appl. No.: 09/682,589

(22) Filed: Sep. 25, 2001

(65) Prior Publication Data

US 2004/0027737 A1 Feb. 12, 2004

(51) Int. Cl.$^7$ .................................................. H02H 7/00
(52) U.S. Cl. ........................ 361/19; 361/141; 335/216
(58) Field of Search .................... 361/141, 19; 335/216

(56) References Cited

U.S. PATENT DOCUMENTS

| | | |
|---|---|---|
| 4,680,666 A | 7/1987 | Rios |
| 4,689,707 A | 8/1987 | Schwall |
| 5,216,568 A | 6/1993 | Harada et al. |
| 5,650,903 A | 7/1997 | Gross et al. |
| 5,731,939 A | 3/1998 | Gross et al. |
| 5,739,997 A | 4/1998 | Gross |
| 6,147,844 A | 11/2000 | Huang et al. |

*Primary Examiner*—Gregory J. Toatley, Jr.
*Assistant Examiner*—Isabel Rodriguez
(74) *Attorney, Agent, or Firm*—Collard & Roe, P.C.

(57) ABSTRACT

A superconducting magnet electrical circuit is provided for quench protection. A superconducting coil assemblage is provided including a plurality of spatially separated main and secondary magnet coil portions. The main magnet coil portions are connected in series to form at least one main coil series circuit. The secondary magnet coil portions are also connected in a series to form at least one secondary coil series circuit. At least one temperature limiting circuit is also provided. The temperature limiting circuit may be a quench heater circuit or a quench resistor circuit. The temperature limiting circuit has a plurality of quench heaters or a plurality of quench resistors connected with the superconducting coil assemblage. A superconductive switch is coupled with the superconducting coil assemblage.

16 Claims, 1 Drawing Sheet

BALANCED QUENCH PROTECTION CIRCUIT

BACKGROUND OF INVENTION

1. Field of the Invention

The invention relates to superconducting magnets. More particularly, a balanced quench protection circuit is provided to protect its superconductive assemblage from damage during a quench.

2. The Prior Art

As is well known, a magnet coil wound of superconductive material can be made superconducting by placing it in an extremely cold environment. For example, a coil may be made superconducting by enclosing it in a cryostat or pressure vessel containing a cryogen. The extreme cold enables the superconducting wires to be operated in the superconducting state. In this state, the resistance of the wires is practically zero. To introduce a current flow through the coils, a power source is initially connected to the coils for a short time period. In the superconducting state, the current will continue to flow through the coils, thereby maintaining a strong magnetic field. In other words, because superconductive windings offer no resistance to electrical current flow at low temperatures, the superconducting magnet is persistent. The electric current that flows through the magnet is maintained within the magnet and does not decay noticeably with time. Superconducting magnets find wide application in the field of magnetic resonance imaging ("MRI").

In a typical MRI magnet, the main superconducting magnet coils are enclosed in a cylindrically shaped cryogen pressure vessel. The cryogen vessel is contained within an evacuated vessel and formed with an imaging bore in the center. The main magnet coils develop a strong magnetic field in the imaging volume of the axial bore.

A common cryogen is liquid helium. During superconducting operation, liquid helium boils to form helium gas. The gas is either recondensed for recycling and reuse or is vented to the atmosphere.

A major concern in such apparatus is the discontinuance or quenching of superconducting operation. Quenching can produce undesirable and possibly damaging high temperatures and voltages within the magnet. During a quench event, the current in the persistent superconducting coils decays rapidly. The rapid decay is as a result of resistive zone(s) developed in the coils for example due to thermal disturbance. Quenching may occur from an energy disturbance, such as from a magnet coil frictional movement. The energy disturbance heats a section of superconducting wire, raising its temperature above the critical temperature of superconducting operation. The heated section of wire becomes normal with some electrical resistance. The resulting $I^2R$ Joule heating further raises the temperature of the section of wire increasing the size of the normal section. An irreversible action called quench then occurs. During a quench, the electromagnetic energy of the magnet is quickly dumped or converted into thermal energy through the increased Joule heating.

For MRI application, a homogeneous magnetic field is required in the imaging volume. To provide the required homogeneity, the magnet coil is divided into a plurality of sub-coils. The sub-coils are spaced along and around the axis of the superconducting magnet such that they are not thermally connected. As a result, when only one of the superconducting coils quenches, the entire energy of the strong magnetic field may be dumped into the quenching coil. A hot spot and possible damage is caused unless a suitable quench system is provided. Quench protection can be accomplished by quickly quenching the other coils or sending part of the energy to dump resistors. Damage from rapid rise in temperature and voltage, or from quick electromagnetic force change in the magnet, is thereby prevented.

A number of quench systems for protection of superconducting magnets are known. For example, U.S. Pat. No. 6,147,844 to Huang et al, U.S. Pat. No. 5,739,997 to Gross, and U.S. Pat. Nos. 5,650,903 and 5,731,939 to Gross et al relate to quench protection circuits for superconducting magnets.

An actively shielded MRI magnet consists of main coils and bucking coils. These coils produce a homogeneous field in the image volume and reduce fringe fields. Most of the superconducting MRI magnets are made of coils that are symmetric with respect to a symmetry mid-plane. During a quench, the current in different coils may not decay at exactly the same rate. A net differential force acting on the coils and coil supporting structure could thereby be induced. The net differential force in the right and left halves of the magnets and/or between the main coil and the bucking coil structures results in an unbalanced quench. An unbalanced quench could potentially damage coil supporting structures, depending on the severity of the unbalance. Therefore, an unbalanced quench is undesirable for supporting structures without a large built-in safety margin in the structural design. A large safety margin can increase cost and/or space occupation.

SUMMARY OF INVENTION

To solve the above problems, a superconducting magnet electrical circuit is provided. The circuit results in protection of a superconductive magnet through a balanced quench. A superconducting coil assemblage is provided including a plurality of spatially separated main and secondary magnet coil portions. The main magnet coil portions are connected in series to form at least one main coil series circuit. The secondary magnet coil portions are likewise connected in series to form at least one secondary coil series circuit. At least one temperature limiting circuit with a plurality of quench heaters or quench resistors is also provided. The temperature limiting circuit is connected in parallel with the superconducting coil assemblage. When a quench heater circuit is used, the circuit may include a plurality of quench heaters connected in parallel with each other. When a quench resistor circuit is used, the circuit may include a plurality of quench resistors connected in series or in parallel with each other.

Thus, the secondary magnet coil portions, for example, two bucking coils, are grouped together in a sub-circuit. The main magnet coils are likewise grouped together in a separate sub-circuit. In addition, a superconductive switch is coupled with the superconducting assemblage. When a quench occurs, the current flow through the coil (main or bucking) that initiated the quench will be the same as the symmetric (main or bucking) coil with respect to the mid-plane because they are connected in the same sub-circuit. Though currents in different sub-circuits may be different, the symmetry or current balance is preserved in terms of the current in the two half magnets. Therefore the force, acting on each half structure and/or the main and bucking structures, will be minimized, resulting in a balanced quench.

In one aspect of the invention, at least two quench heater or quench resistor circuits are connected in parallel with the superconducting coil assemblage. In another aspect of the invention, at least one quench heater circuit and at least one quench resistor circuit are connected in parallel with the superconducting coil assemblage. The quench heater circuit includes a plurality of generally identical quench heaters connected in parallel. The quench resistor circuit includes a plurality of generally identical quench resistors connected in series or in parallel with each other.

In a further aspect, at least one quench heater is positioned in thermal contact with the main magnet coil portions. Likewise, at least one quench heater is positioned in thermal contact with the secondary magnet coil portions.

In another aspect, the magnet coils of the superconducting coil assembly are essentially completely in contact with a fluid cryogen and at least one temperature limiting circuit is connected in parallel with the superconducting coil assemblage.

BRIEF DESCRIPTION OF DRAWINGS

Other objects and features of the present invention will become apparent from the following detailed description considered in connection with the accompanying drawing. It should be understood, however, that the drawing is designed for the purpose of illustration only and not as a definition of the limits of the invention.

In the drawing.

DETAILED DESCRIPTION

Figure 1:
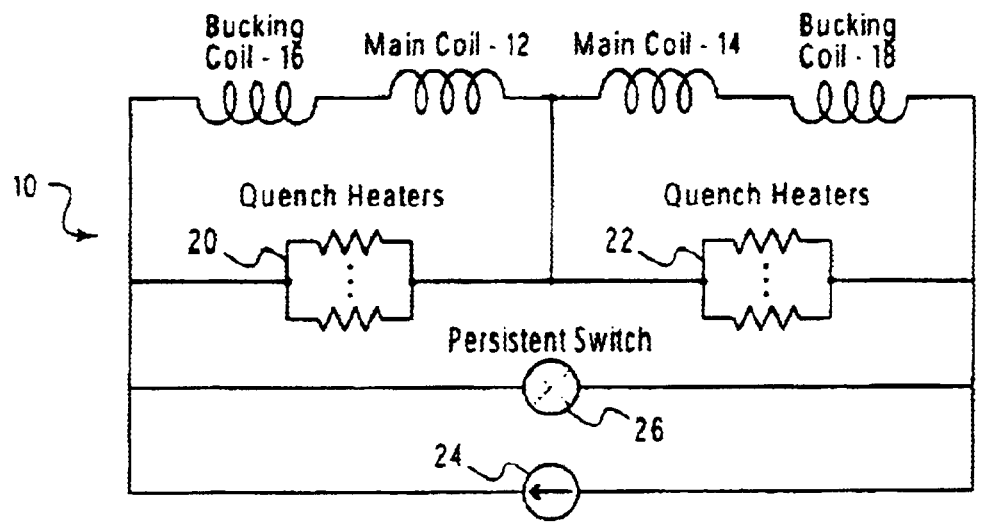
FIG. 1 is a schematic circuit diagram of a prior art quench protection circuit.

Referring to FIG. 1, a simplified schematic circuit diagram of an existing quench protection circuit 10 is shown for an actively shielded MRI magnet consisting of main coils 12, 14 and bucking coils 16, 18. Main coils 12, 14 produce a homogeneous field in the image volume and bucking coils 16, 18 reduce fringe fields. As shown in FIG. 1, coils 12, 16 and 14, 18 of the superconducting magnet are symmetrical with respect to a symmetry mid-plane. Connected across magnet coils 12 and 16 and 14 and 18 respectively, and in parallel therewith, are quench heater or resistive load circuits 20, 22. The circuit 10 contains a power supply (i.e. current supply) 24 for ramping up the superconductive assemblage and a superconductive switch 26. The superconductive switch 26 is used to transfer between a persistent superconducting operating mode and a non-persistent superconducting operating mode. Typically the superconducting switch 26 is used to start up the magnet's superconductive operation and to purposely run down such operation.

Figure 2:
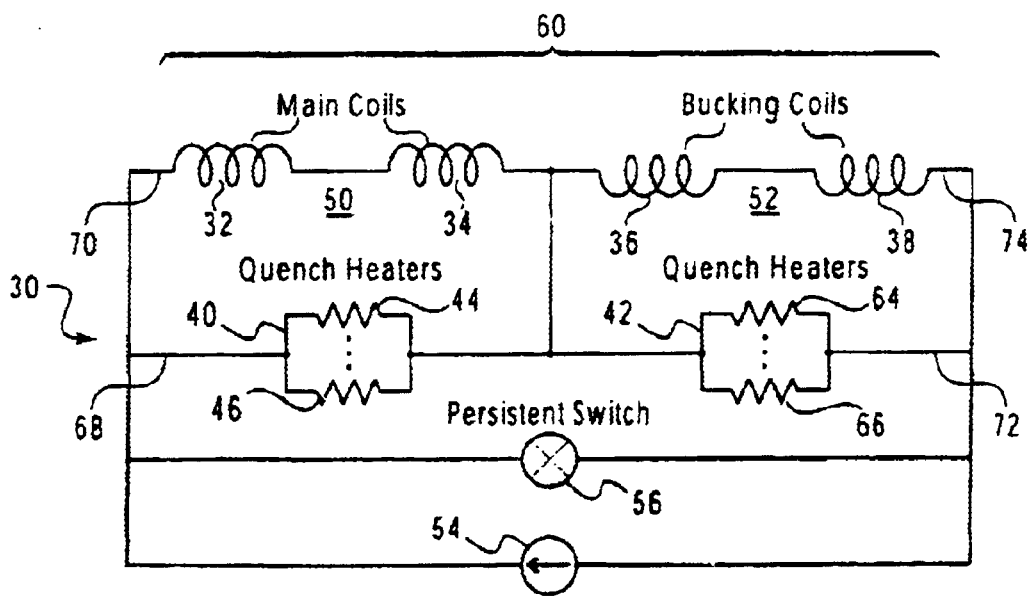
FIG. 2 is a schematic circuit diagram of an embodiment of a balanced quench protection circuit of the invention, which protects its superconductive-coil assemblage from damage during a quench.

Now referring to FIG. 2, a schematic circuit diagram of an embodiment of a balanced quench protection circuit 30 is shown. Circuit 30 includes a superconducting coil assemblage 60 including a plurality of spatially separated main magnet coil portions, such as main coils 34. Main magnet coils 32, 34 are connected in series to form a main coil series circuit 50. A plurality of spatially separated secondary magnet coil portions, such as bucking coils 36, 38, are also included in the assemblage. Bucking coils 36, 38 are likewise connected in series to form a secondary coil series circuit 52.

Preferably, main coil series circuit 50 has at least four main magnet coil portions connected in series. Secondary coil series circuit 52 likewise preferably has at least two secondary magnet coil portions connected in series. The superconductive coil assemblage may be designed to be cryostable or "non-impregnated" or to be impregnated. A cryostable assemblage is one cooled by direct physical contact of a fluid cryogen (such as liquid, and some top-layer gaseous, helium having a temperature of generally 4 Kelvin) with the superconductor wire or tape windings that make up the superconductor-coil assemblage. The superconductor wire or tape may be a copper-stabilized Nb—Ti wire having a porous electrical insulation (such as a conventional spiral-wound porous electrical insulation that also has gaps between adjacent spiral turns). The fluid cryogen permeates the porous insulation to make direct physical contact with the copper-stabilized Nb—Ti wire.

In certain MRI applications, each coil portion 32, 34 may be an entire main coil whose purpose is to create a high magnetic field strength in the imaging volume. Similarly, each secondary coil portion 36, 38 may be an entire bucking coil carrying current in an opposite direction to the main coils and positioned to shape a more homogeneous magnetic field within the imaging volume. Each coil portion may also be chosen to be an entire shielding coil carrying current in an opposite direction to the main coils and positioned to prevent stray magnetic fields from escaping far away from the magnet assembly. In other MRI applications, a coil portion 32, 34 and 36, 38 may be, for example, one half of a main coil or of a secondary coil respectively.

Connected across main coils 32, 34 and bucking coils 36, 38 respectively and in parallel therewith, is at least one temperature limiting circuit such as quench heater or resistive load circuits 40, 42. A "quench heater" is a heater that is placed in the coils to accelerate a quench. A "quench (or dump) resistor" is a resistor that helps to dissipate energy during a quench. Quench heater or resistor circuit 40 includes a plurality of individual heaters or resistors, such as heaters or resistors 44 and 46, connected in parallel with each other. Similarly, quench heater or resistor circuit 42 includes a plurality of individual heaters or resistors, such as heaters or resistors 64, 66, connected in parallel with each other. When quench resistors or dump resistors are used, the individual resistors may be connected in series or in parallel with each other. Quench heater or resistor circuit 40 has a lead 68 coupled with a first lead 70 of superconductive coil assemblage 60. Similarly, quench heater or resistor circuit 42 has a lead 72 coupled with a second lead 74 of superconductive coil assemblage 60. Preferably, the quench heaters or resistors 44, 46, 64, 66 are generally identical quench heaters or resistors. Preferably, at least one quench heater is positioned in thermal contact with main magnet coil portions 32, 34. Similarly, at least one quench heater is preferably positioned in thermal contact with secondary magnet coil portions 36, 38. As in the circuit of FIG. 1, circuit 30 of FIG. 2 contains a power supply 54. Also as in FIG. 1, a superconductive switch 56 is coupled with the superconducting coil assemblage.

As shown in FIG. 2, the two bucking coils 36, 38 are grouped together in bucking coil sub-circuit 52. Similarly, the two main coils 32, 34 are grouped together in separate main coil sub-circuit 50. When circuit 30 is operating in the superconducting mode, electric current will flow only in the superconducting loop consisting of the superconducting coil assemblage 60 and the superconductive switch 56. In the superconducting mode of circuit 30, no electric current will flow through, and no heat will be generated by, the quench heater or resistor circuit 40, 42. If a quench starts in a local area of one coil portion; for example 32, a voltage difference will be set up in sub-circuit 50 and thus a voltage difference in quench heater/resistor circuit 40 will heat up and quench the nearby superconductive switch 56. This quenching will set up a voltage difference between the leads 68, 72 of the quench heater/resistor circuits 40, 42 and through each of the quench heaters/resistors 64, 66 as well as quench heaters/resistors 44, 46. The quench heaters/resistors 44, 46, 64, 66 all will heat up and quench the coil portions of their respective sub-circuits 50, 52. Thus, when a quench occurs, the current flow through the coil (main or bucking) that initiated the quench will be the same as the symmetric (main or bucking) coil with respect to the mid-plane, because they are connected in the same sub-circuit. Although currents in the different sub-circuits 50, 52 may be different, the symmetry or current balance is preserved in terms of the current in the two half magnets. Therefore, the force, acting on the right and left half structures and/or the main and bucking structures, will be minimized.

While preferred embodiments of the present invention have been shown and described, it is to be understood that many changes and modifications may be made thereunto without departing from the spirit and scope of the invention as defined in the appended claims.

What is claimed is:

1. A superconducting magnet electrical circuit comprising:
   (a) a superconducting coil assemblage including a plurality of spatially separated and geometrically symmetric main magnet coil portions connected in series to form at least one main coil series circuit and a plurality of spatially separated and geometrically symmetric secondary magnet coil portions connected in series to form at least one secondary coil series circuit so that said main coil or said secondary coil circuit will have an exact same current in the coils during a quench, keeping interactive forces among the coils symmetrically balanced;
   (b) at least one temperature limiting circuit connected with the superconducting coil assemblage selected from the group consisting a quench heater circuit or a quench resistor circuit; and
   (c) a superconductive switch coupled with the superconducting coil assemblage.

2. A superconducting magnet electrical circuit according to claim 1 wherein said coil portions are essentially completely in contact with a fluid cryogen.

3. The superconducting magnet electrical circuit according to claim 1 wherein the superconducting coil assemblage has at least two geometrically symmetric main magnet coil portions connected directly in series to form the main coil series circuit so the current in the coils within one series circuit is forced to be the same under normal and quench conditions and the interactive force with the other coils remains balanced during a quench.

4. The superconducting magnet electrical circuit according to claim 1 wherein the superconducting coil assemblage has at least two geometrically symmetric secondary magnet coil portions connected directly in series to form the secondary coil series circuit so the current in the coils within one series circuit is forced to be the same under normal and quench conditions and the interactive force with the other coils remains balanced during a quench.

5. The superconducting magnet electrical circuit according to claim 1 wherein the secondary magnet coil portions carry current in an opposite direction to the main magnet coil portions.

6. The superconducting magnet electrical circuit according to claim 1 wherein the secondary magnet coil portions form a shielding coil positioned to prevent stray magnetic fields from escaping the magnet assembly.

7. A superconducting magnet electrical circuit comprising:
   (a) a superconducting coil assemblage including a plurality of spatially separated and geometrically symmetric main magnet coil portions connected in series to form at least one main coil series circuit and a plurality of spatially separated and geometrically symmetric secondary magnet coil portions connected in series to form at least one secondary coil series circuit so that said main coil or said secondary coil circuit will have an exact same current in the coils during a quench, keeping interactive forces among the coils symmetrically balanced;
   (b) at least one quench heater circuit with a plurality of quench heaters connected in parallel with the superconducting coil assemblage; and
   (c) a superconductive switch coupled with the superconducting coil assemblage.

8. The superconducting magnet electrical circuit according to claim 7 wherein at least one quench heater is positioned in thermal contact with the main magent coil portions and at least one quench heater is positioned in thermal contact with the secondary magnet coil portions.

9. The superconducting magnet electrical circuit according to claim 7 wherein the number of said heaters connected in parallel with each of said separated main magnet coil portions is at least equal to the number of said main magnet coil portions being protected.

10. The superconducting magnet electrical circuit according to claim 7 comprising at least two quench heater circuits with each circuit having a different current decaying profile during a quench.

11. The superconducting magnet electrical circuit according to claim 10 wherein each quench heater circuit comprises at least two quench heaters.

12. A superconducting magnet electrical circuit comprising:
    (a) a superconducting coil assemblage including a plurality of spatially separated and geometrically symmetric main magnet coil portions connected in series to form at least one main coil series circuit and a plurality of spatially separated and geometrically symmetric secondary magnet coil portions connected in series to form at least one secondary coil series circuit so that said main coil or said secondary coil circuit will have an exact same current in the coils during a quench, keeping interactive forces among the coils symmetrically balanced;
    (b) at least one quench resistor circuit connected in parallel with the superconducting coil assemblage, said quench resistor circuit having a plurality of quench resistors connected in series or in parallel with each other; and
    (c) a superconductive switch coupled with the superconducting coil assemblage.

13. A superconducting magnet electrical circuit comprising:
    (a) a superconducting coil assemblage including a plurality of spatially separated and geometrically symmetric main magnet coil portions connected in series to form at least one main coil series circuit and a plurality of spatially separated and geometrically symmetric secondary magnet coil portions connected in series to form at least one secondary series circuit so that said main coil or said secondary coil circuit will have an exact same current in the coils during a quench, keeping interactive forces among the coils symmetrically balanced;
(b) at least one quench heater circuit with a plurality of generally identical quench heaters connected in parallel with the superconducting coil assemblage;
(c) at least one quench resistor circuit connected in parallel with the superconducting coil assemblage, said quench resistor circuit having a plurality of generally identical quench resistors connected in series or in parallel with each other; and
(d) a superconductive switch coupled with the superconducting coil assemblage.

14. A superconducting magnet electrical circuit comprising:
(a) a superconducting coil assemblage including at least two spatially separated and geometrically symmetric main magnet coils connected in series to form at least one main coil series circuit and at least two spatially separated and geometrically symmetric secondary magnet coils connected in series to form at least one secondary coil series circuit, said coils being essentially completely in contact with a fluid cryogen, so that said main coil or said secondary coil circuit will have an exact same current in the coils during a quench, keeping interactive forces among the coils symmetrically balanced;
(b) at least one temperature limiting circuit connected in parallel with the superconducting coil assemblage, said temperature limiting circuit selected from a first group consisting of a quench heater circuit comprising a plurality of quench heaters connected in parallel, and a quench resistor circuit comprising a plurality of quench resistors connected in parallel or in series; and
(c) a superconductive switch coupled with the superconducting coil assemblage.

15. A superconducting magnet electrical circuit comprising:
(a) a superconducting coil assemblage including at least two spatially separated and geometrically symmetric main magnet coils connected in series to form at least one main coil series circuit and at least two spatially separated and geometrically symmetric secondary magnet coils connected in series to from at least one secondary coil series circuit, said coils being essentially completely in contact with a fluid cryogen, so that said main coil or said secondary coil circuit will have an exact same current in the coils during a quench, keeping interactive forces among the coils symmetrically balanced;
(b) at least one quench heater circuit with a plurality of quench heaters connected in parallel with the superconducting coil assemblage wherein at least one quench heater is positioned in thermal contact with the main coil portion and at least one quench heater is positioned in thermal contact with the secondary magnet coil portion; and
(c) a superconductive switch coupled with the superconducting assemblage.

16. A superconductive magnet electrical circuit comprising:
(a) a superconducting coil assemblage including at least two spatially separated and geometrically symmetric main magnet coils connected in series to form at least one main magnet coil series circuit and at least two spatially separated and geometrically symmetric secondary magnet coils connected in series to form at least one secondary coil series circuit, said coils being essentially completely in contact with a fluid cryogen, so that said main coil or said secondary coil circuit will have an exact same current in the coils during a quench, keeping interactive forces among the coils symmetrically balanced;
(b) at least one quench heater circuit with a plurality of generally identical quench heaters connected in parallel with the superconducting coil assemblage wherein at least one quench heater is positioned in thermal contact with the main magnet coils; and
(c) at least one quench resistor circuit connected in parallel with the superconducting coil assemblage, said quench resistor circuit having a plurality of generally identical quench resistors connected in series or in parallel with each other; and
(d) a superconductive switch coupled with the superconducting coil assemblage.

* * * * *